US011937293B2

(12) United States Patent
Cao et al.

(10) Patent No.: US 11,937,293 B2
(45) Date of Patent: Mar. 19, 2024

(54) ADAPTIVE RANDOM ACCESS RESPONSE WINDOW

(71) Applicant: ZTE CORPORATION, Guangdong (CN)

(72) Inventors: Wei Cao, Guangdong (CN); Zhen Yang, Guangdong (CN); Nan Zhang, Guangdong (CN); Jianwu Dou, Guangdong (CN); Linxi Hu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 216 days.

(21) Appl. No.: 17/377,928

(22) Filed: Jul. 16, 2021

(65) Prior Publication Data

US 2021/0345398 A1    Nov. 4, 2021

Related U.S. Application Data

(63) Continuation of application No. PCT/CN2019/072171, filed on Jan. 17, 2019.

(51) Int. Cl.
*H04W 74/00* (2009.01)
*H04B 7/185* (2006.01)
*H04W 56/00* (2009.01)

(52) U.S. Cl.
CPC ........ *H04W 74/008* (2013.01); *H04B 7/1851* (2013.01); *H04W 56/0055* (2013.01); *H04W 74/006* (2013.01); *H04W 74/0833* (2013.01)

(58) Field of Classification Search
CPC ............ H04W 74/008; H04W 74/006; H04W 74/0833; H04W 56/0055; H04B 7/1851
See application file for complete search history.

(56) References Cited

U.S. PATENT DOCUMENTS

| 2013/0336268 A1* | 12/2013 | Better | H04W 72/21 370/329 |
| 2015/0181366 A1* | 6/2015 | Chae | H04W 56/001 370/336 |

(Continued)

FOREIGN PATENT DOCUMENTS

| CN | 109152027 A | 1/2019 |
| CN | 109219147 A | 1/2019 |
| WO | 2018227793 A1 | 12/2018 |

OTHER PUBLICATIONS

Nomor Research GMBH, et al: "Initial Random Access Procedure in Non-Terrestrial Networks (NTN)" 3GPP TSG-RAN WG2 Meeting # 104, R2-1818510, Spokane, USA; Nov. 12, 2018-Nov. 16, 2018, Nov. 12, 2018 (Nov. 12, 2018), 6 pages.

(Continued)

*Primary Examiner* — Junpeng Chen
(74) *Attorney, Agent, or Firm* — Duane Morris LLP (57) ABSTRACT

This disclosure relates generally to wireless communications and, more particularly, to systems and methods for determining an adaptive random access response window length in non-terrestrial networks. In one embodiment, a method performed by a communication device includes: receiving system information from a communication node, wherein the communication node communicates using a satellite in orbit or a high altitude platform station (HAPS); and determining an adaptive random access response window length based on the system information and whether the communication device has access to situation information that: characterizes a location of the communication device, an ephemeris of the satellite or a trajectory of the HAPS, and a payload type of the satellite or the HAPS.

15 Claims, 5 Drawing Sheets

(56) References Cited

U.S. PATENT DOCUMENTS

2016/0309506 A1    10/2016  Lim
2018/0102807 A1*    4/2018  Chen .................. H04L 25/0328
2018/0302915 A1*   10/2018  Einhaus ............ H04W 72/1268
2021/0029658 A1*    1/2021  Mahalingam ...... H04B 7/18513
2021/0175964 A1*    6/2021  Kusashima ............ H04B 7/185

OTHER PUBLICATIONS

Thales, et al: "NR-NTN: TP for Chap 7.3 NR modifications to support NTN", 3GPP TSG RAN Meeting #80, RP-180658, La Jolla, USA; Jun. 11, 2018-Jun. 14, 2018, Jun. 4, 2018 (Jun. 4, 2018), pp. 1-37.
Samsung: "Considerations on random access for NTN", 3GPP TSG RAN WG1 Meeting #92b, R1-1804395, Sanya, China; Apr. 16, 2018-Apr. 20, 2018, Apr. 15, 2018 (Apr. 15, 2018), 4 pages.

* cited by examiner

FIG. 5

ADAPTIVE RANDOM ACCESS RESPONSE WINDOW

TECHNICAL FIELD

This disclosure relates generally to wireless communications and, more particularly, to systems and methods for determining an adaptive random access response window length in non-terrestrial networks.

BACKGROUND

As the number of applications and services for digital data continues to explode, the demands and challenges placed on network resources and operators will continue to increase. Being able to deliver a wide variety of network performance characteristics that future services will demand is one of the primary technical challenges faced by service providers today.

Timing for random access may be dependent upon an amount of delay time that communications are in transition between a transmitter and receiver. Current techniques for random access may account for delay time within terrestrial networks (e.g., communications between devices on the Earth) but not for non-terrestrial networks (e.g., communications between a satellite orbiting the Earth and a device not orbiting the Earth). Therefore, current techniques for random access may not be entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a communication device includes: receiving system information from a communication node, wherein the communication node communicates using a satellite in orbit or a high altitude platform station (HAPS); and determining an adaptive random access response window length based on the system information and whether the communication device has access to situation information that: characterizes a location of the communication device, an ephemeris of the satellite or a trajectory of the HAPS, and a payload type of the satellite or the HAPS.

In a further embodiment, a method performed by a communication node includes: transmitting system information to a communication device, wherein the communication node communicates using a satellite in orbit or a high altitude platform station (HAPS), wherein the communication device is configured to determine an adaptive random access response window length based on the system information and whether the communication device has access to situation information that: characterizes a location of the communication device, an ephemeris of the satellite or a trajectory of the HAPS, and a payload type of the satellite or the HAPS.

In a further embodiment, a communication device includes: a receiver configured to: receive system information from a communication node, wherein the communication node communicates using a satellite in orbit or a high altitude platform station (HAPS); and a processor configured to: determine an adaptive random access response window length based on the system information and whether the communication device has access to situation information that: characterizes a location of the communication device, an ephemeris of the satellite or a trajectory of the HAPS, and a payload type of the satellite or the HAPS.

In a further embodiment, a communication node includes: a transmitter configured to: transmit system information to a communication device, wherein the communication node communicates using a satellite in orbit or a high altitude platform station (HAPS), wherein the communication device is configured to determine an adaptive random access response window length based on the system information and whether the communication device has access to situation information that: characterizes a location of the communication device, an ephemeris of the satellite or a trajectory of the HAPS, and a payload type of the satellite or the HAPS.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

The discussion below may refer to functional entities or processes which are similar to those mentioned above with respect to conventional communication systems. As would be understood by persons of ordinary skill in the art, however, such conventional functional entities or processes do not perform the functions described below, and therefore, would need to be modified or specifically configured to perform one or more of the operations described below. Additionally, persons of skill in the art would be enabled to configure functional entities to perform the operations described herein after reading the present disclosure.

Figure 1:
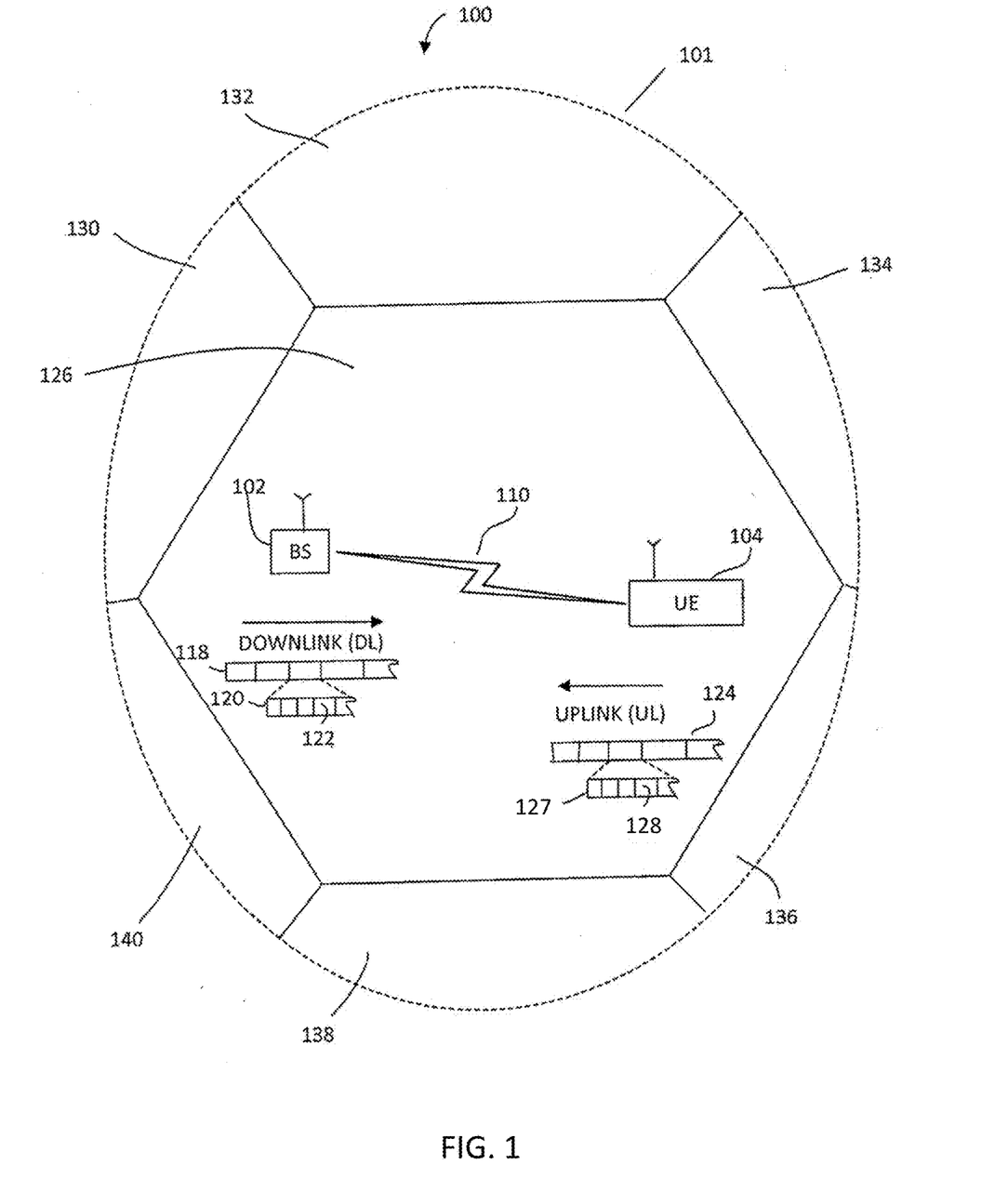
FIG. 1 illustrates an exemplary wireless communication network in which techniques disclosed herein may be implemented, in accordance with some embodiments.

FIG. 1 illustrates an exemplary wireless communication network 100 in which techniques disclosed herein may be implemented, in accordance with an embodiment of the present disclosure. Such an exemplary network 100 includes a base station 102 (hereinafter "BS 102") and multiple user equipment devices 104 (hereinafter "UEs 104") that can communicate with each other via respective communication links 110 (e.g., a wireless communication channel), and a cluster of notional cells 126, 130, 132, 134, 136, 138 and 140 overlaying a geographical area with a network 101. Each UE 104 may undergo a random access procedure to join the network 101. In FIG. 1, the BS 102 and each UE 104 are contained within a respective geographic boundary of cell 126. Each of the other cells 130, 132, 134, 136, 138 and 140 may include at least one BS operating at its allocated bandwidth to provide adequate radio coverage to its intended users. Accordingly, reference to a cell may be a short hand reference to a BS with an associated coverage region or area (e.g., cell). In certain embodiments, a cell may be interchangeably referred to as a BS or a node.

For example, the BS 102 may operate at an allocated channel transmission bandwidth (e.g., spectrum) to provide adequate coverage to each UE 104. The spectrum may be regulated to define a licensed range and/or an unlicensed range. The BS 102 and each UE 104 may communicate via a downlink radio frame 118, and an uplink radio frame 124 respectively. The radio frames may also be referred to more simply as a frame. Each frame 118/124 may be further divided into sub-frames 120/127 which may include data symbols 122/128. In the present disclosure, the BS 102 and each UE 104 are described herein as non-limiting examples of "communication nodes," generally, which can practice the methods disclosed herein. Such communication nodes may be capable of wireless and/or wired communications, in accordance with various embodiments of the invention. In certain embodiments, a communication device may refer more specifically to a UE in relationship to a BS and a communication node may refer more specifically to a BS in relation to the UE.

Figure 2:
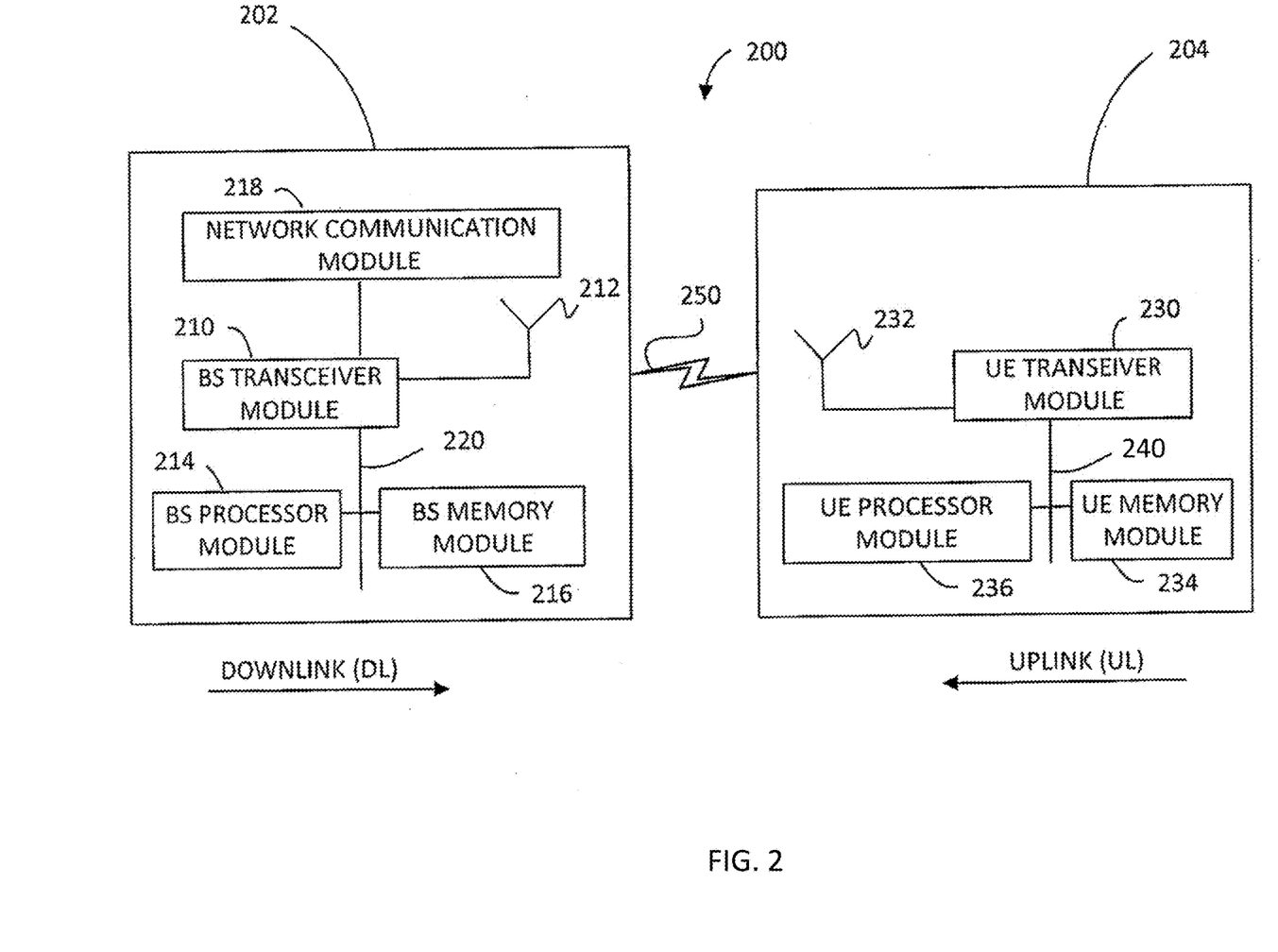
FIG. 2 illustrates a block diagram of an exemplary wireless communication system for transmitting and receiving wireless communication signals in accordance with some embodiments.

FIG. 2 illustrates a block diagram of an exemplary wireless communication system 200 for transmitting and receiving wireless communication signals (e.g., OFDM/OFDMA signals) in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment or network 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver module 230 may be referred to herein as an "uplink" transceiver module 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver module 210 may be referred to herein as a "downlink" transceiver module 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceiver modules 210 and 230 are coordinated in time such that the uplink receiver is coupled to the uplink antenna 232 for reception of transmissions over the wireless transmission link 250 at the same time that the downlink transmitter is coupled to the downlink antenna 212.

The UE transceiver module 230 and the BS transceiver module 210 are configured to communicate via the wireless data communication link 250, and cooperate with a suitably configured RF antenna arrangement 212/232 that can support a particular wireless communication protocol and modulation scheme. In some exemplary embodiments, the UE transceiver module 210 and the BS transceiver module 210 are configured to support industry standards such as the Long Term Evolution (LTE) and emerging 5G standards, and the like. It is understood, however, that the invention is not necessarily limited in application to a particular standard and associated protocols. Rather, the UE transceiver module 230 and the BS transceiver module 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage and/or computer-readable medium known in the art. In this regard, memory modules 216 and 234 may be coupled to the transceiver modules 210 and 230, respectively, such that the transceiver modules 210 and 230 can read information from, and write information to, memory modules 216 and 234, respectively. The memory modules 216 and 234 may also be integrated into their respective transceiver modules 210 and 230. In some embodiments, the memory modules 216 and 234 may each include a cache memory for storing temporary variables or other intermediate information during execution of instructions to be executed by transceiver modules 210 and 230, respectively. Memory modules 216 and 234 may also each include non-volatile memory for storing instructions to be executed by the transceiver modules 210 and 230, respectively.

The network communication module 218 generally represents the hardware, software, firmware, processing logic, and/or other components of the base station 202 that enable bi-directional communication between the BS transceiver module 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that the BS transceiver module 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically or virtually constructed, programmed, formatted and/or arranged to perform the specified operation or function.

With the development of the 5G new radio (NR) access technologies, a broad range of use cases including enhanced mobile broadband, massive machine-type communications (MTC), critical MTC, and the like can be realized. To expand the utilization of NR access technologies, 5G connectivity via satellites is being considered as a promising new application. In contrast to the terrestrial networks where all communication nodes (e.g., BSes) are located on the Earth, a network incorporating satellites in orbit or within airborne vehicles (e.g., a high altitude platform station (HAPS)) that perform some or all of the functions of terrestrial base stations is referred to as a non-terrestrial network (NTN).

In NTNs, the satellites may be Geostationary Earth Orbit (GEO) satellites, Low Earth Orbit (LEO) satellites or Medium Earth Orbit (MEO) satellites. A GEO satellite may run in an orbit with altitude of, for example, 35,786 kilometers (km), which implies a minimum round trip delay (RTD) that may be 2*2*35786e3/3e8=477 milliseconds (ms) with a bentpipe GEO payload. For a LEO satellite with, for example, a 600 km orbit altitude, a corresponding minimum round trip delay (RTD) may be 2*600e3/3e8=4 ms with a regenerative LEO payload. Accordingly, a challenge brought by the large RTD of NTNs is how to handle random access given the large RTD.

Furthermore, a satellite beam footprint diameter could be, for example, 500 km or even larger in diameter. Also, a minimum elevation angle for a satellite beam could be, for example, as small as 5°. Either or both large beam footprints and small elevation angles may result in significantly different RTDs in a single beam.

Accordingly, systems and methods in accordance with various embodiments include random access timing with an adaptive scheme (e.g., an adaptive random access response monitoring window) for different orbit altitudes, beam footprint sizes and elevation angles. In various embodiments, the minimum and maximum time delay (or corresponding minimum and maximum distance) may be broadcast in system information. Also, in various embodiments, a differential delay in a specific beam may be used to determine the monitoring window length in a random access procedure. Advantageously, an adaptive random access response monitoring window length can be calculated for satellites with different orbit altitudes, satellite payload types, beam footprint sizes, and elevation angles. Thus, users (e.g., UEs) can derive their random access monitoring window length according to their own capability (e.g., on a per UE basis), which saves on both power and dedicated signaling for random access.

Figure 3:
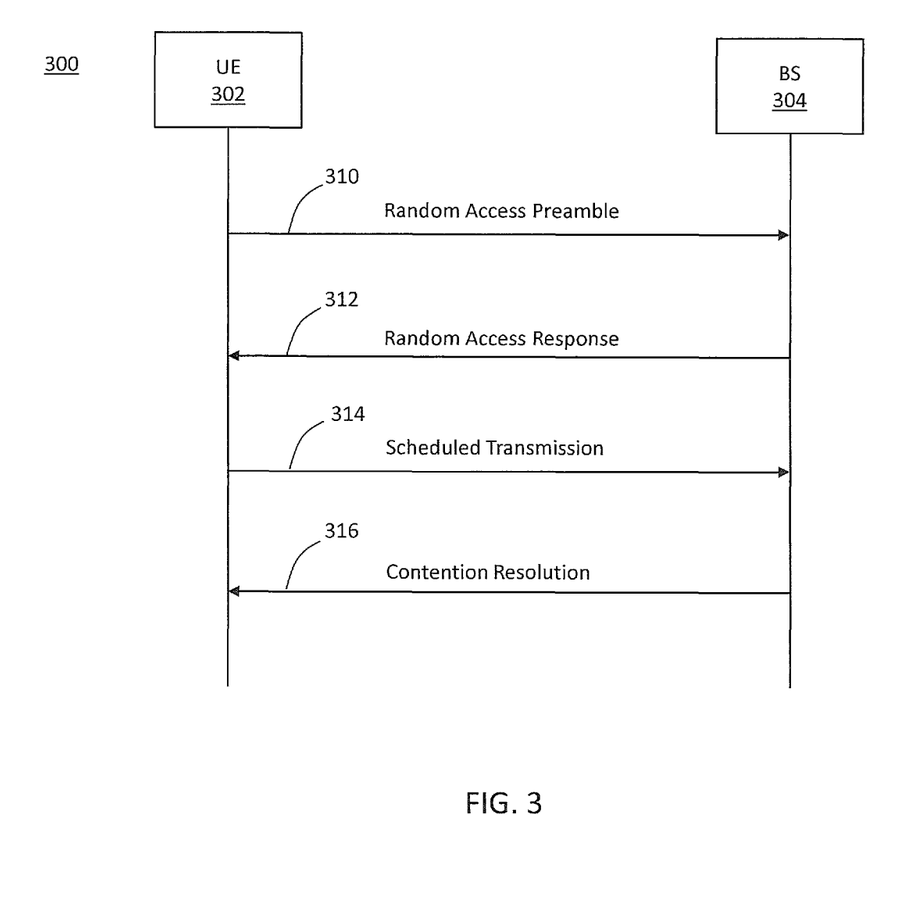
FIG. 3 is a sequence diagram illustrating a contention based random access procedure, in accordance with some embodiments.

FIG. 3 is a sequence diagram illustrating a contention based random access procedure 300, in accordance with some embodiments. The procedure 300 may be performed by a UE 302 and a BS 304. It is noted that the procedure 300 is merely an example, and is not intended to limit the present disclosure. Accordingly, it is understood that additional operations (e.g., blocks) may be provided before, during, and after the procedure 300 of FIG. 3, certain operations may be omitted, certain operations may be performed concurrently with other operations, and that some other operations may only be briefly described herein.

At operation 310, a random access preamble message may be sent from the UE 302 to the BS 304. In certain embodiments, the random access preamble message of operation 310 may be referred to as a Message 1 of random access. At operation 312, a random access response message may be sent from the BS 304 to the UE 302. In certain embodiments, the random access response message of operation 312 may be referred to as a Message 2 of random access. At operation 314, a scheduled transmission message may be sent from the UE 302 to the BS 304. In certain embodiments, the scheduled transmission message of operation 312 may be referred to as a Message 3 of random access. At operation 316, a contention resolution message may be sent from the BS 304 to the UE 302. In certain embodiments, the contention resolution message of operation 316 may be referred to as a Message 4 of random access.

In various embodiments, once the random access preamble (e.g., the Message 1) is transmitted, the UE may start a timer (e.g., a ra-ResponseWindow timer) at the first physical downlink control channel (PDCCH) occasion from the end of the random access preamble message transmission. Thus, the UE monitors the PDCCH while ra-ResponseWindow is running. The ra-ResponseWindow may have an enumerated type with range (e.g., noted with index values as sl1, sl2, sl4, sl8, sl10, sl20, sl40, sl80 defined in certain communication standards).

In particular embodiments, a network may configure a value for the ra-ResponseWindow that is lower than or equal to 10 ms. However, taking GEO as an example, the maximum delay difference experienced by different UEs (e.g., a near UE and a far UE) in a beam can be as large as 16 ms, if a 10 degree minimum elevation is assumed. Therefore the current ra-ResponseWindow range may not be enough to cover different UEs (e.g., the near UE and the far UE) in a same beam. Accordingly, each UE may adopt an adaptive random access response monitoring window so that the random access response monitoring window at each UE will be sufficient for each UE to receive the same transmission from the BS (e.g., no matter if the UE is the near UE closest to the BS or the far UE farthest from the BS).

In numerous embodiments, for a specific beam, a single trip propagation delay (e.g., between a UE and a BS that communicates using a satellite) may range from a minimum delay (also referred to as delay_min) and a maximum delay (also referred to as delay_max). As will be discussed further below, a delay differential between the delay_min and delay_max may be referred to as a delay_differential. The values may vary according to satellite orbit altitude, satellite payload type, beam footprint size, and elevation angle. To help UEs in a single beam to monitor for their random access responses, the following information may be broadcast in system information. Accordingly, a UE may receive the broadcast system information to determine its adaptive random access response window length. This broadcast system information may be referred to as among four different Options broadcast from a BS (e.g., a BS in a NTN), for ease of explanation.

In Option 1, a delay_min and delay_max are broadcast. Alternatively, in Option 1, a 2*delay_min (e.g., two times delay_min) and 2*delay_max (e.g., two times delay_max) are broadcast.

In Option 2, a delay_min and delay_differential are broadcast, where delay_differential=delay_max−delay_min.

Alternatively, in Option 2, 2*delay_min and 2*delay_differential are broadcast, where 2*delay_differential=2*(delay_max−delay_min).

In Option 3, a current serving satellite orbit altitude (derivable from the satellite's ephemeris), a satellite payload type, a minimum elevation angle, and a maximum elevation angle of current serving beam are broadcast. From these parameters, delay_min, delay_max and delay_differential may be obtained (e.g., determined) at a receiving UE.

In Option 4, a set of satellite parameters may be broadcast. This set of satellite parameters may include an orbit altitude (derivable from the satellite's ephemeris), a satellite payload type, a minimum elevation angle, and a maximum elevation angle. In particular embodiments, with Option 4, the set of the serving beam parameters may be variable with time. Accordingly, the delay_min, delay_max and delay_differential may be obtainable (e.g., determined) by a receiving UE based on the set of satellite parameters.

In various embodiments, referred to for ease of explanation as Case 1, a UE may not have access to situation information that characterizes a location of the UE, an ephemeris of a satellite or a trajectory of a HAPS used by a BS, and a payload type of the satellite or the HAPS used by the BS. Accordingly, the UE may not be able to determine the exact amount of propagation delay when the UE does not have such situation information. Thus, to save its power in random access response monitoring, the UE may start its monitoring window from T1+delay_min*2 after its Message 1 transmission, where T1 is a Message 1 transmission time. Since the propagation delay of this UE ranges in from delay_min to delay_max, the random access response window length (also referred to as adapt_RAR_win_len) may be be 2*(delay_max−delay_min)+orig_RAR_win_len. In certain embodiments, an original random access response window (also referred to as orig_RAR_win_len), for example, may refer to a ra-ResponseWindow parameter value defined in certain communication standards. If the broadcast system information includes the delay_min and delay_differential, the adaptive random access response window length can be referred to as adapt_RAR_win_len=2*delay_differential+orig_RAR_win_len.

Figure 4:
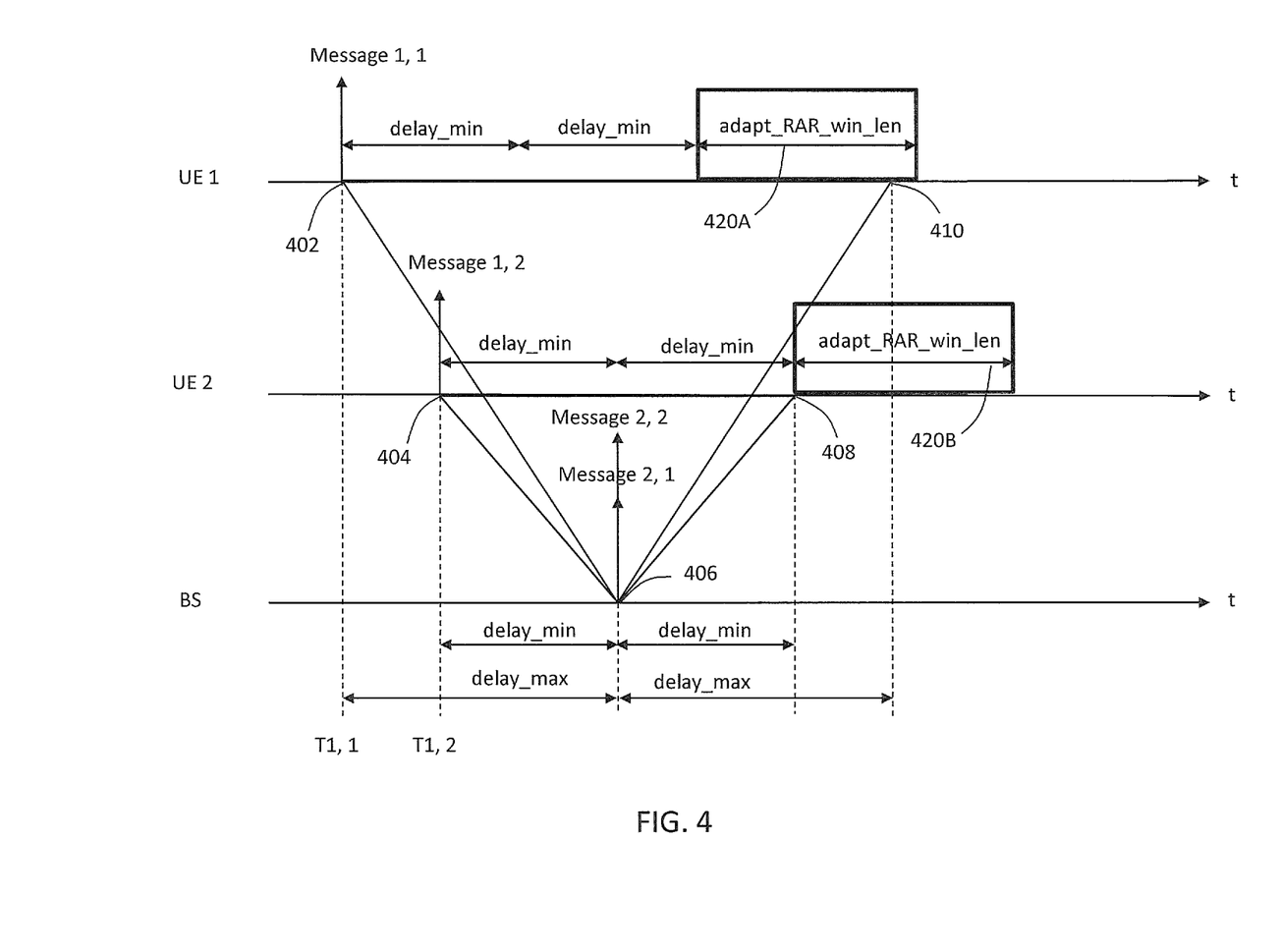
FIG. 4 is a diagram that illustrates how an adaptive random access response window length is determined when a UE does not have access to situation information, in accordance with some embodiments.

FIG. 4 is a diagram that illustrates how an adaptive random access response window length is determined when a UE does not have access to situation information, in accordance with some embodiments. A consistent amount of time may pass along a horizontal axis but be broken up, for ease of explanation, among a first UE, a second UE, and a BS. The BS may be configured to receive a Message 1 from the first UE (also noted as UE 1) and the second UE (also noted as UE 2). So that both the Message 1 from the first UE and the second UE is received at the same time, the Message 1 from the first UE may be transmitted at a first time 402 and the Message 1 from the second UE may be transmitted at a second time 404. Then, both the message 1s from the first UE and the second UE may arrive at the BS at a third time 406. The BS may then transmit a respective Message 2 in response to receipt of the Message 1 from the first UE and the second UE at the third time 406. Accordingly, the respective Message 2 may be received at the second UE at a fourth time 408 and the respective Message 2 may be received at the first UE at a fifth time 410.

As illustrated, a delay_min may be between the second time 404 and the third time 406 or the third time 406 and the fourth time 408. Also, a delay_max may be between the first time 402 and the third time 406 or the third time 406 and the fifth time 410. Furthermore, an adapt_RAR_win_len 420A may begin for the first UE after two delay_mins have elapsed (e.g., after a minimum amount of round trip delay) after Message 1 transmission. In this manner, the fifth time 410 may occur during the adapt_RAR_win_len 420A of the first UE. Also, an adapt_RAR_win_len 420B for the second UE may also begin after two delay_mins have elapsed (e.g., after a minimum amount of round trip delay) after Message 1 transmission. Thus, the fourth time 408 may occur during the adapt_RAR_win_len 420B of the second UE.

As noted above, the delay_min and delay_max may be determined from the broadcast system information of a BS. Also, the adapt_RAR_win_len may be determined from the delay_min and delay_max as 2*delay_differential+orig_RAR_win_len, where the delay_differential is the differential between the delay_min and the delay_max and the orig_RAR_win_len is provided in system information.

In particular embodiments, referred to for ease of explanation as Case 2, a UE may have access to situation information that characterizes a location of the UE, an ephemeris of a satellite or a trajectory of a HAPS used by a BS, and a payload type of the satellite or the HAPS used by the BS. Accordingly, the UE may be able to determine the exact amount of propagation delay when the UE does have such situation information. The exact amount of propagation delay may be referred to as delay_calc. Accordingly, in certain optional embodiments, the UE can ignore the aforementioned Options in a system broadcast (e.g., the UE may ignore the broadcast system information to determine the delay_min and/or delay_max). The UE may start its monitoring window from T1+delay_calc*2 after its Message 1 transmission, where T1 is the Message 1 transmission time. Accordingly, the adapt_RAR_win_len may be the orig_RAR_win_len. The orig_RAR_win_len may refer to, for example, a predetermined value (e.g., ra-ResponseWindow) defined in certain communication standards.

Figure 5:
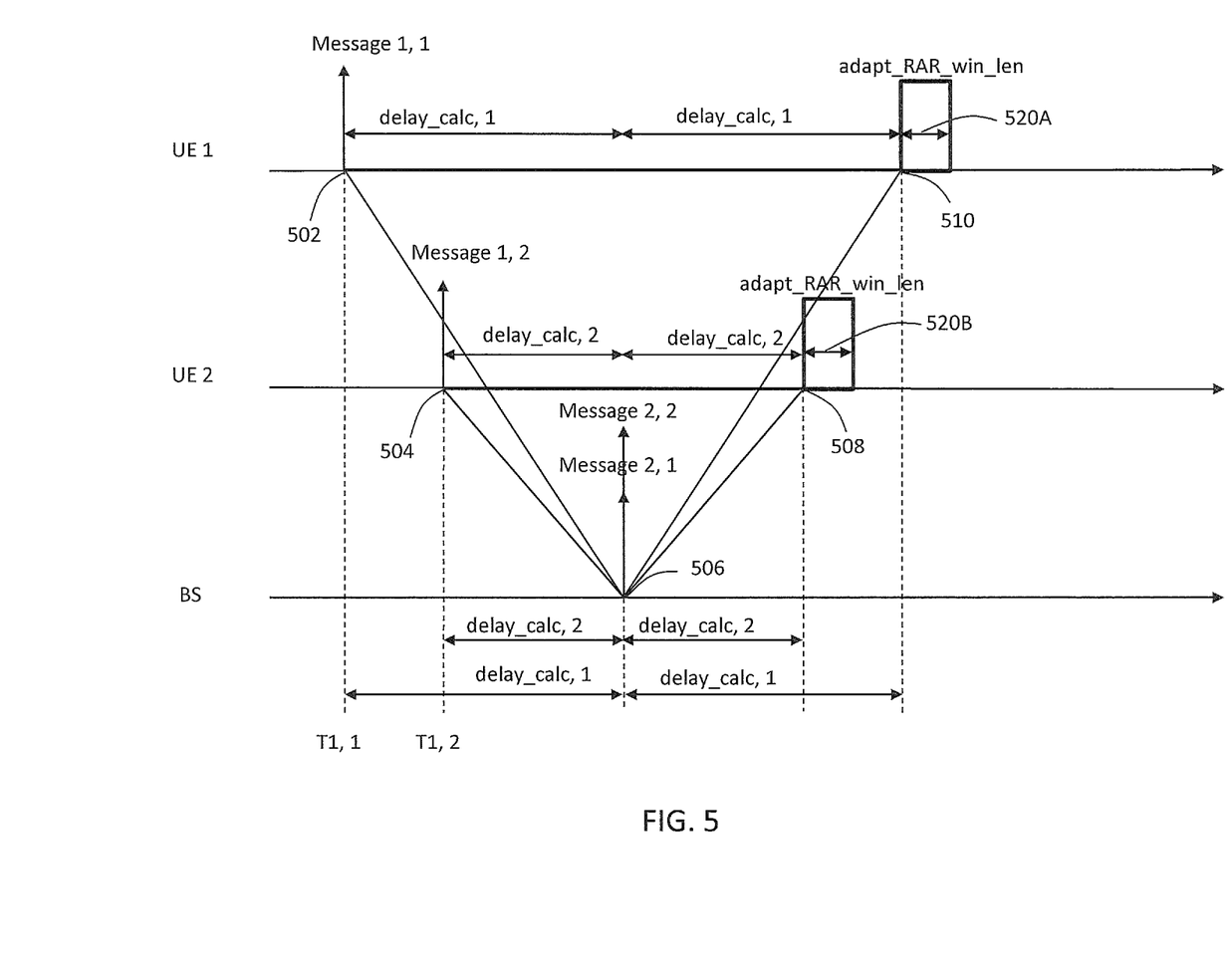
FIG. 5 is a diagram that illustrates how an adaptive random access response window length is determined when a UE has access to situation information, in accordance with some embodiments.

FIG. 5 is a diagram that illustrates how an adaptive random access response window length is determined when a UE has access to situation information, in accordance with some embodiments. A consistent amount of time may pass along a horizontal axis but be broken up, for ease of explanation, among a first UE (also noted as UE 1), a second UE (also noted as UE 2), and a BS. The BS may be configured to receive a Message 1 from the first UE and the second UE. So that both the Message 1 from the first UE and the second UE is received at the same time, the Message 1 from the first UE may be transmitted at a first time 502 and the Message 1 from the second UE may be transmitted at a second time 504. Then, both the respective message is from the first UE and the second UE may arrive at the BS at a third time 506. The BS may then transmit a respective Message 2 in response to receipt of the Message 1 from the first UE and the second UE at the third time 506. Accordingly, the respective Message 2 may be received at the second UE at a fourth time 508 and the respective Message 2 may be received at the first UE at a fifth time 510.

As illustrated, a delay_calc for the second UE (e.g., delay_calc, 2) may be between the second time 504 and the third time 506 or the third time 506 and the fourth time 508.

Also, a delay_calc for the first UE (e.g., delay_calc, 1) may be between the first time 502 and the third time 506 or the third time 506 and the fifth time 510. Furthermore, an adapt_RAR_win_len 520A may begin for the first UE after two instances of delay_calc 1 have elapsed (e.g., after a calculated amount of round trip delay) after Message 1 transmission. In this manner, the fifth time 510 may occur during the adapt_RAR_win_len 520A of the first UE. Also, an adapt_RAR_win_len 520B for the second UE may also begin after two instances of delay_calc 2 have elapsed (e.g., after a calculated amount of round trip delay) after Message 1 transmission. Thus, the fourth time 508 may occur during the adapt_RAR_win_len 520B of the second UE.

As noted above, the delay_min and delay_max need not be determined from the broadcast system information of a BS when the UE has access to situation information. Rather, the adapt_RAR_win_len may be determined as the orig_RAR_win_len is provided in system information since the delay time specific for the UE may be calculated. Furthermore, in particular embodiments, it can be seen from a comparison between FIG. 4 and FIG. 5 that the adapt_RAR_win_len of Option 1 is longer than that of Option 2.

In various embodiments, a UE may additionally determine the adapt_RAR_win_len as outlined in Option 1 when the UE has access to situation information that characterizes a location of the communication device, an ephemeris of the satellite, and a payload type of the satellite. The UE may utilize the determination of adapt_RAR_win_len as outlined in Option 1 to guarantee a more reliable random access response monitoring. In certain embodiments, this redundant determination of adapt_RAR_win_len may be applied for UEs that are on vehicles or in other situations for which power consumption (e.g., the available power supply) is not as important (e.g., not as constrained) as other issues such as accuracy. In particular embodiments, this redundant determination of adapt_RAR_win_len may be applied when the UE does not receive a random access response (e.g., Message 2) within its expected adapt_RAR_win_len (e.g., in case the determination of adapt_RAR_win_len in Option 2 was incorrect).

In certain embodiments, certain UEs may have lower capabilities or limited resources. For example, certain more constrained UEs (e.g., low cost Internet of Things (IoT) UEs) may be more power or processing constrained than other UEs. These more constrained UEs may utilize, for example, a look up table (LUT) to determine values, such as a delay_ min, delay_max, or a delay_differential. This LUT may also cover an epheremis. An example LUT is provided in table 1, below:

TABLE 1

| Orbit altitude (km) | Payload type | Minimum elevation angle (degree) | Maximum elevation angle (degree) | Delay_max (ms) | Delay_min (ms) |
| --- | --- | --- | --- | --- | --- |
| 35,786 | Bentpipe | 10 | 90 | 270.58 | 238.57 |
| 1,200 | Regenerative | 10 | 90 | 10.44 | 4 |

The more constrained UEs may search the LUT to find an appropriate delay_min, delay_max, or a delay_differential in accordance with the broadcast system information. Since the more constrained UEs may be produced for specific applications (e.g., only for GEO with a given minimum elevation angle), the predetermined or pre-stored LUT may be utilized so that the more constrained UEs may be able to determine the delay_min, delay_max, or delay_differential without actually performing calculations for delay_min, delay_max, or delay_differential. Then, the more constrained UEs may determine their adapt_RAR_win_len in accordance with Case 1.

In certain embodiments, a NTN BS may utilize a steering beam. Accordingly, different sets of satellite parameters may be transmitted in the steering beam at different times. For example, a first set of satellite parameters, referred to as Set A, may include, for example, an orbit altitude/ephemeris, serving start time, serving duration, and satellite payload type. Set A may be broadcast during a first period of time, referred to as Period A. A second set of satellite parameters, refereed to as Set B, may include, for example, a minimum elevation angle and a maximum elevation angle. This Set B may be broadcast during a second period of time, referred to as Period B. Period B may immediately follow Period A. Also, Period A and Period B may be of a same amount of time in certain embodiments, or may be of a different amount of time in other embodiments. In particular embodiments, Set A may have static satellite parameter values while Set B may have varying satellite parameter values. Also, in further embodiments, Period A may be longer than Period B.

In various embodiments, a UE may receive (e.g., listen to) Set A when the UE accesses the NTN BS's network. Then, the UE may receive (e.g., listen to) Set B to track/update the satellite or beam specific parameters after receiving Set A. Accordingly, the UE may determine an appropriate delay_min and delay_max by receiving Set A and Set B from the NTN BS steering beam.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element or embodiment herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, one or more of the functions described in this document may be performed by means of computer program code that is stored in a "computer program product", "computer-readable medium", and the like, which is used herein to generally refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), which when executed, enable the computing system to perform the desired operations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a communication device, comprising:
   receiving system information from a communication node, wherein the communication node communicates using a satellite in orbit or a high altitude platform station, HAPS;
   determining a start of a random access response window; and
   monitoring for a signal from the communication node within the random access response window, wherein the determining the start of the random access response window comprising:
      determining a minimum propagation delay, delay min, for communications between the communication device and the communication node, based on the system information; or
      determining a propagation delay, delay calc, for communications between the communication device and the communication node, based on the system information and situation information, wherein the random access response window:
         starts from T1+delay min*2, where T1 is a Message 1 transmission finish time of the communication device, if the communication device does not have access to situation information; or
         starts from T1+delay calc*2, where T1 is a Message 1 transmission finish time of the communication device, if the communication device has access to situation information, wherein the situation information comprises at least one of:
            a location of the communication device,
            an ephemeris of the satellite, or
            a trajectory of the HAPS, or
            a payload type of the satellite or the HAPS.

2. The method of claim 1, wherein the system information comprises:
   a maximum propagation delay and a minimum propagation delay; or
   two times the maximum propagation delay and two times the minimum propagation delay; or
   the minimum propagation delay and a differential between the minimum propagation delay and the maximum propagation delay; or
   two times the minimum propagation delay and two times the differential between the minimum propagation delay and the maximum propagation delay.

3. The method of claim 1, further comprising:
   determining a random access response window length to monitor for a signal from the communication node within the random access response window, wherein the random access response window length is two times a differential between the minimum propagation delay and the maximum propagation delay plus a predetermined original random access response window length; or
   wherein the random access response window length is a predetermined original random access response window length.

4. The method of claim 1, wherein the maximum propagation delay and the minimum propagation delay is determined using a look up table based on system information.

5. A method performed by a communication node, comprising:
   transmitting system information to a communication device, wherein the communication node communicates using a satellite in orbit or a high altitude platform station (HAPS),
   wherein the communication device is configured to determine the start of a random access response window and monitor for a signal from the communication node within the random access response window, wherein the communication device determines the start of the random access response window by performing a process using the system information, the process comprising:
      determining a minimum propagation delay, delay min, for communications between the communication device and the communication node, based on the system information; or
      determining a propagation delay, delay calc, for communications between the communication device and the communication node, based on the system information and situation information, wherein the random access response window:
         starts from T2+delay min*2, where T1 is a Message 1 transmission finish time of the communication device, if the communication device does not have access to situation information; or
         starts from T1+delay calc*2, where T1 is a Message 1 transmission finish time of the communication device, if the communication device has access to situation information, wherein the situation information comprises at least one of:
            a location of the communication device,
            an ephemeris of the satellite, or
            a trajectory of the HAPS, or
            a payload type of the satellite or the HAPS.

6. The method of claim 5, wherein the system information comprises at least:
   a maximum propagation delay and a minimum propagation delay; or
   two times the maximum propagation delay and two times the minimum propagation delay; or
   the minimum propagation delay and a differential between the minimum propagation delay and the maximum propagation delay; or
   two times the minimum propagation delay and two times the differential between the minimum propagation delay and the maximum propagation delay; or an altitude of the satellite or the HAPS; or
   a serving start time; or
   a serving duration; or
   a minimum elevation angle of a serving beam; or
   a maximum elevation angle of a serving beam.

7. The method of claim 6, wherein the altitude of the satellite or the HAPS, the serving start time, and the serving duration is broadcast with a first period, and the minimum elevation angle of a serving beam and the maximum elevation angle of a serving beam is broadcast with a second period.

8. The method of claim 7, wherein the first period and the second period are of different durations.

9. A communication device, comprising:
   a receiver configured to:
      receive system information from a communication node, wherein the communication node communicates using a satellite in orbit or in a high altitude platform station (HAPS); and
   a processor configured to:
      determine the start of a random access response window and monitor for a signal from the communication node within the random access response window, wherein the processor determines the start of the random access response window by performing a process using the system information, the process comprising:
      determining a minimum propagation delay, delay min, for communications between the communication device and the communication node, based on the system information; or
      determining a propagation delay, delay calc, for communications between the communication device and the communication node, based on the system information and situation information, wherein the random access response window:
         starts from T1+delay min*2, where T1 is a Message 1 transmission finish time of the communication device, if the communication device does not have access to situation information; or
         starts from T1+delay calc*2, where T1 is a Message 1 transmission finish time of the communication device, if the communication device has access to situation information, wherein the situation information comprises at least one of:
         a location of the communication device,
         an ephemeris of the satellite, or
         a trajectory of the HAPS, or
         a payload type of the satellite or the HAPS.

10. The communication device of claim 9, wherein the system information comprises at least:
   a maximum propagation delay and a minimum propagation delay; or
   two times the maximum propagation delay and two times the minimum propagation delay; or
   the minimum propagation delay and a differential between the minimum propagation delay and the maximum propagation delay; or
   two times the minimum propagation delay and two times the differential between the minimum propagation delay and the maximum propagation delay; or
   an altitude of the satellite or the HAPS; or
   a serving start time; or
   a serving duration; or
   a minimum elevation angle of a serving beam; or
   a maximum elevation angle of a serving beam.

11. The communication device of claim 9, wherein the adaptive random access response window length is:
   two times a differential between the minimum propagation delay and the maximum propagation delay plus a predetermined original random access response window length; or
   a predetermined original random access response window length.

12. A communication node, comprising:
   a transmitter configured to:
      transmit system information to a communication device, wherein the communication node communicates using a satellite in orbit or a high altitude platform station (HAPS), wherein the communication device is configured to determine the start of a random access response window and monitor for a signal from the communication node within the random access response window, wherein the communication device determine s the start of the random access response window by performing a process using the system information, the process comprising:
      determining a minimum propagation delay, delay min, for communications between the communication device and the communication node, based on the system information; or
      determining a propagation delay, delay calc, for communications between the communication device and the communication node, based on the system information and situation information, wherein the random access response window:
         starts from T1+delay min*2, where T1 is a Message 1 transmission finish time of the communication device, if the communication device does not have access to situation information; or
         starts from T1+delay calc*2, where T1 is a Message 1 transmission finish time of the communication device, if the communication device has access to situation information, wherein the situation information comprises at least one of:
         a location of the communication device,
         an ephemeris of the satellite, or
         a trajectory of the HAPS, or
         a payload type of the satellite or the HAPS.

13. The communication node of claim 12, wherein the system information comprises:
   a maximum propagation delay and a minimum propagation delay; or two times the maximum propagation delay and two times the minimum propagation delay; or
   the minimum propagation delay and a differential between the minimum propagation delay and the maximum propagation delay; or
   two times the minimum propagation delay and two times the differential between the minimum propagation delay and the maximum propagation delay; or an altitude of the satellite or the HAPS; or
a serving start time; or
a serving duration; or
a minimum elevation angle of a serving beam; or
a maximum elevation angle of a serving beam.

14. The communication node of claim 13, wherein the altitude of the satellite or the HAPS, the serving start time, and the serving duration is broadcast with a first period, and the minimum elevation angle of a serving beam and the maximum elevation angle of a serving beam is broadcast with a second period.

15. The communication node of claim 14, wherein the first period and the second period are of different durations.

* * * * *